United States Patent
Sherrill et al.

(10) Patent No.: US 6,170,781 B1
(45) Date of Patent: Jan. 9, 2001

(54) DOOR EDGE GAP AND RADAR SIGNATURE MITIGATION DOOR SEAL

(75) Inventors: David Eugene Sherrill, Tujunga; Robert Wade Chapman, Redondo Beach, both of CA (US)

(73) Assignee: Northrop Grumman Corporation, Los Angeles, CA (US)

(*) Notice: Under 35 U.S.C. 154(b), the term of this patent shall be extended for 0 days.

(21) Appl. No.: 09/235,083

(22) Filed: Jan. 21, 1999

(51) Int. Cl.[7] .................................................. B64C 1/14
(52) U.S. Cl. ................................ 244/129.5; 49/475.1
(58) Field of Search ........................ 244/129.4, 129.5, 244/131; 49/475.1, 478.1

(56) References Cited

U.S. PATENT DOCUMENTS

| | | | |
|---|---|---|---|
| 1,549,721 | * 8/1925 | Kraft | 244/131 X |
| 2,368,702 | 2/1945 | Bourne | 244/130 |
| 3,183,548 | 5/1965 | Speakman | 16/163 |
| 4,220,298 | 9/1980 | Willis | 244/129.5 |
| 4,312,153 | 1/1982 | Parkinson et al. | 49/485 |
| 4,576,347 | 3/1986 | Opsahl | 244/130 |
| 4,712,752 | 12/1987 | Victor | 244/129.1 |
| 4,785,741 | 11/1988 | Gronow | 105/348 |
| 4,884,772 | 12/1989 | Kraft | 244/199 |
| 5,044,580 | 9/1991 | Williams | 244/214 |
| 5,069,401 | 12/1991 | Shepherd et al. | 244/118.5 |
| 5,156,360 | * 10/1992 | Shine | 244/129.4 X |
| 5,226,618 | 7/1993 | Greenhalgh | 244/213 |
| 5,695,154 | 12/1997 | Castellucci et al. | 244/130 |

* cited by examiner

Primary Examiner—Robert P. Swiatek
(74) Attorney, Agent, or Firm—Terry J. Anderson; Karl J. Hoch, Jr.

(57) ABSTRACT

An aircraft door sealing system for use with an aircraft door. The aircraft door is movable between open and closed positions with respect to a door frame. The door has a peripheral door opening portion and a peripheral door seal portion. The door frame has a peripheral frame opening portion and a peripheral frame seal portion. The frame opening portion is aligned adjacent the door opening portion when the door is in the closed position. The frame seal portion is aligned adjacent the door seal portion when the door is in the closed position. The sealing system is provided with an elastic seal which is interposed between the door and the door frame. The seal is attached to the door seal portion and the frame seal portion. The seal is expandable and contractible for permitting movement of the door between the open and closed positions thereof. The seal has a pair of seal opening edges disposed between the door opening portion and the frame opening portion. An opening is collectively defined by the door opening portion, the frame opening portion and the seal opening edges when the door is in the open position for facilitating access through the opening and the door frame.

31 Claims, 4 Drawing Sheets

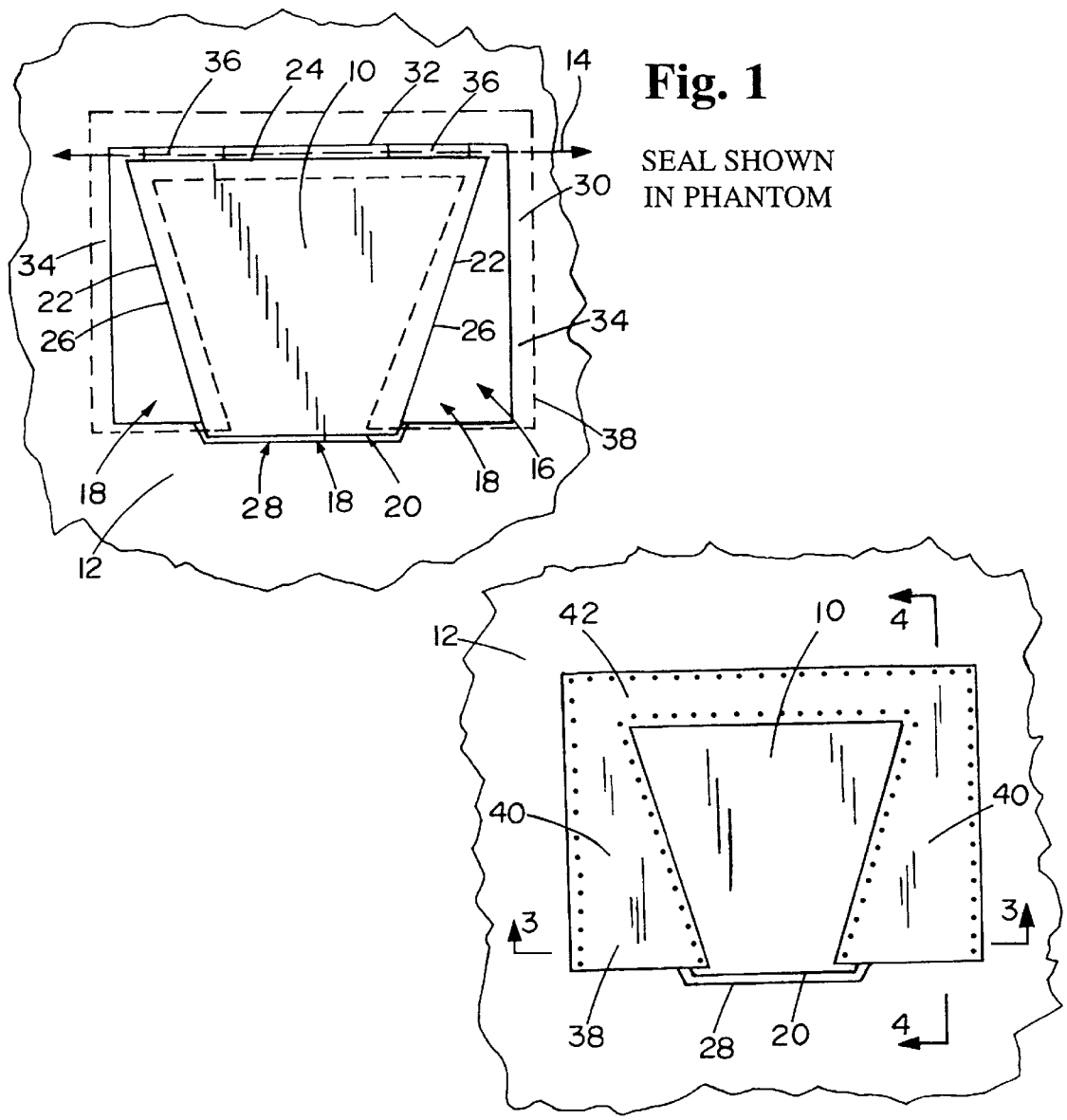

SEAL NOT SHOWN

SEAL NOT SHOWN

DOOR EDGE GAP AND RADAR SIGNATURE MITIGATION DOOR SEAL

FIELD OF THE INVENTION

The present invention relates generally to aircraft door seals, and more particularly to an expandable aircraft door seal which spans across a door/door frame gap.

BACKGROUND OF THE INVENTION

Aircraft employ a wide variety of doors which are exposed to the surrounding environment about the aircraft. For example, access doors and panels permit access to the interior of the aircraft adjacent mechanical and electrical sub-system components for inspection, maintenance and repair. Passenger ingress and egress doors and storage compartment doors permit access to the aircraft interior for passage of passengers and/or cargo therethrough. Such doors and panels are typically opened and closed while the aircraft is on the ground. In addition, there is a variety of flight actuated doors which are opened and closed during various times during aircraft flight. Common examples of flight actuated doors are weapons bay doors (in military aircraft), sensor suite doors, landing gear doors and auxiliary air doors.

Aircraft are subjected to various external and internal loads which may result in temporary deformations of the door frames which are located at various places about the aircraft. For example, it is typical for an aircraft to store fuel within its wings. Thus, when the aircraft is fueled the wings may tend to droop, and the bottom side of the fuselage to be in a compressive state. When the aircraft is in flight, a variety of aerodynamic forces may act to upwardly push the wings, and cause the bottom side of the fuselage to be in a relative tension state. Where there are doors located at regions of the aircraft which are locally subject to such tension and compression forces (e.g., landing gear doors and weapons bay doors) the door frames thereof may deform. Such deformation may occur both in the plane of the door frame and out of the plane of the door frame.

These deformations may result in the formation of gaps or discontinuities between the door and the door frame. As one of ordinary skill in the art can appreciate, these gaps or discontinuities tend to increase the radar signature of the aircraft. As such, the reduction or mitigation of any gaps or discontinuities at or around the door frame is highly desirable.

In addition, it is often desirable that aircraft doors must be able to withstand pressure differentials between the interior and exterior of the door. Typically the interior pressure is greater than the external pressure (i.e., burst pressure). Such a pressure may be a function of the placement of the door upon the aircraft, altitude, and relative aircraft speed. A positive cabin pressure is typically maintained to provide for a hospitable environment. The door frame deformations, however, may result in poor or improper sealed engagement between the door and the door frame.

Though conventional aircraft doors are provided with seals about the perimeter of the door, such seals possess certain deficiencies which detract from their overall utility. In this respect, a common prior art door sealing approach employs blade seals. A blade seal generally takes the form of a metal strip which extends from the door perimeter and engages a door frame when the door is in the closed position. The blade seal overlaps the gap formed between the door and the door frame. In this respect, the blade seal facilitates surface geometry continuity. Additionally, because the blade seal is formed of metal, such a design facilitates a continuity of electromagnetic conductivity across and between the aircraft door and door frame. Blade seal designs, however, require a high degree of maintenance as the seal must be precisely aligned in order to properly seal with the associated door frame. In addition, the seal must be routinely inspected and adjusted in order to compensate for wear of the blade seal contact surface.

Another common prior art approach to sealing the door/door frame gap is to utilize a caulking material or tape. This approach is typically used in access panel applications. Upon closure of the associated door or panel, this approach involves the application of a caulking material or tape over and about the door/door frame gap. The opening of the door results in a breaking of the caulking or tape seal. Each opening and closing cycle requires the reapplication of the caulking material or tape. As such, this sealing approach is both time and labor intensive.

Other prior art door sealing approaches often require the use of pneumatic, hydraulic and/or electro-mechanical actuators. For example, such actuators may be used to inflate expandable tubes or bladders interposed between a door and a door frame to thereby establish a seal thereat. These actuation devices and supporting hardware negatively impact space and weight requirements which may be of a paramount concern. For example, the spacial constrains within an aircraft wing are typically severely limiting and the use of bulky actuator devices for use with wing access panel seals is undesirable. As such, while these door sealing approaches may be highly advantageous for some applications, such approaches may not be suitable for others.

Accordingly, there is a need in the art for a aircraft door sealing system which is capable of substantially mitigating a perimeter gap occurring between the door and the door frame and mitigating the radar signature associated with the perimeter gap.

SUMMARY OF THE INVENTION

In accordance with the present invention, there is provided an aircraft door sealing system for use with an aircraft door. The aircraft door is movable between open and closed positions with respect to a door frame. The door has a peripheral door opening portion and a peripheral door seal portion. The door frame has a peripheral frame opening portion and a peripheral frame seal portion. The frame opening portion is aligned adjacent the door opening portion when the door is in the closed position. The frame seal portion is aligned adjacent the door seal portion when the door is in the closed position. It is contemplated that gaps, voids, or contour discontinuities occurring between the aircraft door and the door frame are especially undesirable because they tend to increase the radar signature, and therefore observableness of the associated aircraft. As such the present invention functions to reduce or mitigate the radar signature of the associated aircraft.

The sealing system is provided with an elastic seal which is interposed between the door and the door frame. The seal is attached to the peripheral door seal portion and the peripheral frame seal portion. The seal is expandable and contractible for permitting movement of the door between the open and closed positions thereof. The seal has a pair of seal opening edges disposed between the peripheral door opening portion and the peripheral frame opening portion. An opening is collectively defined by the peripheral door opening portion, the peripheral frame opening portion and the seal opening edges when the door is in the open position for facilitating access through the opening and the door frame. In the preferred embodiment of the present invention, the elastic seal is formed of an electrically conductive material.

Thus, the sealing system constructed in accordance with the present invention is particularly suited to reduce a perimeter door gap between the aircraft door and the door frame. This is despite the door frame being subject to changes in geometry or deformation thereof, in both in-plane and out-of-plane directions.

Importantly, the gap formed between the door and the door frame is effectively eliminated adjacent the door seal portion and the frame seal portion. This is because the elastic seal is adapted to expand and contract in response to movement the door relative to the door frame (i.e., between the open and closed positions). Thus, sealed engagement between the door and door frame, adjacent the door seal portion and the frame seal portion, need not be disrupted or broken in order to move the door into the open position. This is unlike the prior art door seal approaches which require that the door and the door frame be substantially disengaged in order to open. As such, the present invention avoids problems of reestablishing sealed engagement of the door and the door frame between cycles of moving the door between the open and closed positions.

In addition, as mentioned above, the elastic seal is preferably formed of an electrically conductive material. In this respect, electromagnetic energy is conductible across the seal from the door frame to the door. As such, the seal advantageously facilitates an electrical continuity between the door and door frame for mitigating the aircraft door radar signature thereat.

As such, the aircraft door sealing system constructed in accordance with the present invention represents a significant advancement in the art.

BRIEF DESCRIPTION OF THE DRAWINGS

These, as well as other features of the present invention, will become more apparent upon reference to the drawings wherein:

FIG. 1 is a top view of the aircraft door sealing system of the present invention with the door depicted in a closed position (an elastic seal thereof is depicted in phantom);

FIG. 2 is the door sealing system of FIG. 1 shown with the seal thereof (depicted in solid line);

DETAILED DESCRIPTION OF THE PREFERRED EMBODIMENTS

Figure 3:
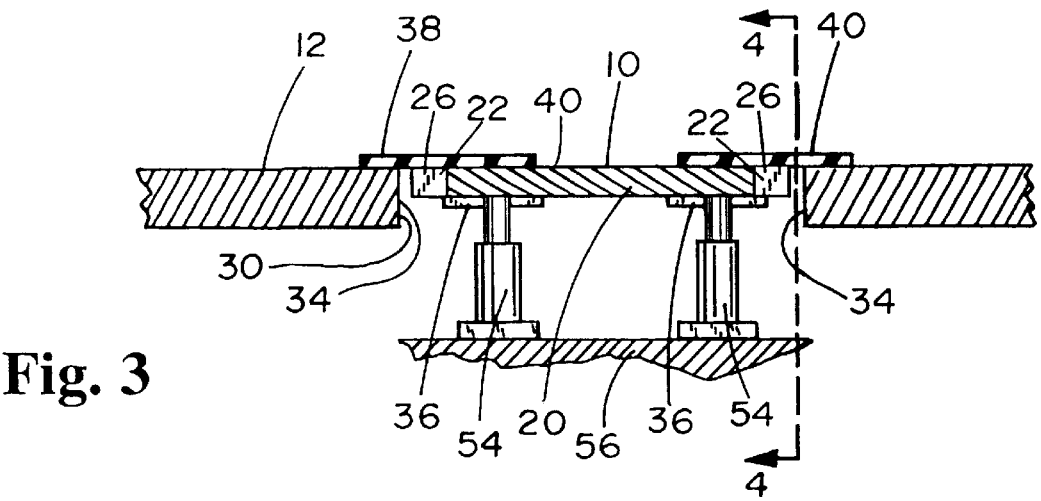
FIG. 3 is a side cross-sectional view of the door sealing system of FIG. 2 as seen along axis 3—3.
Figure 4:
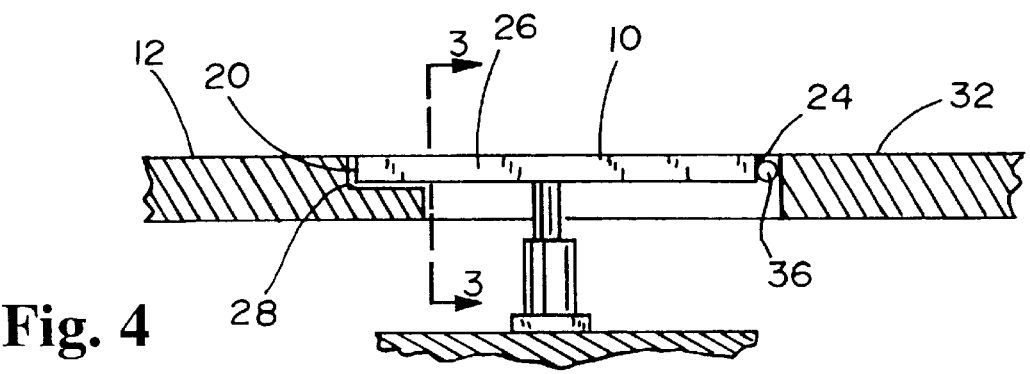
FIG. 4 is a front cross-sectional view of the door sealing system of FIG. 2 as seen along axis 4—4 (the elastic seal thereof is not shown for ease explanation)
Figure 5:
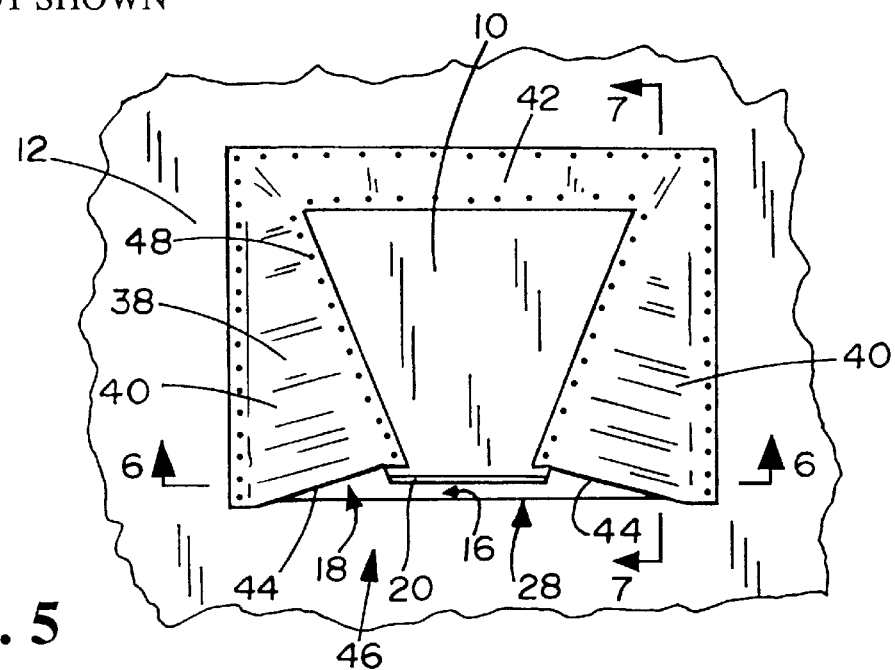
FIG. 5 is a top view of the door sealing system of FIG. 2 with the door depicted in an open position.
Figure 6:
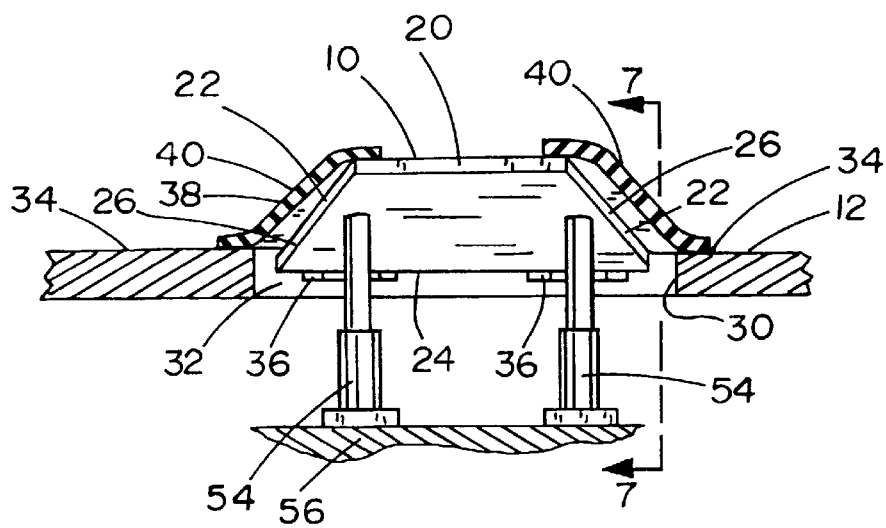
FIG. 6 is a side cross-sectional view of the door sealing system of FIG. 5 as seen along axis 6—6.
Figure 7:
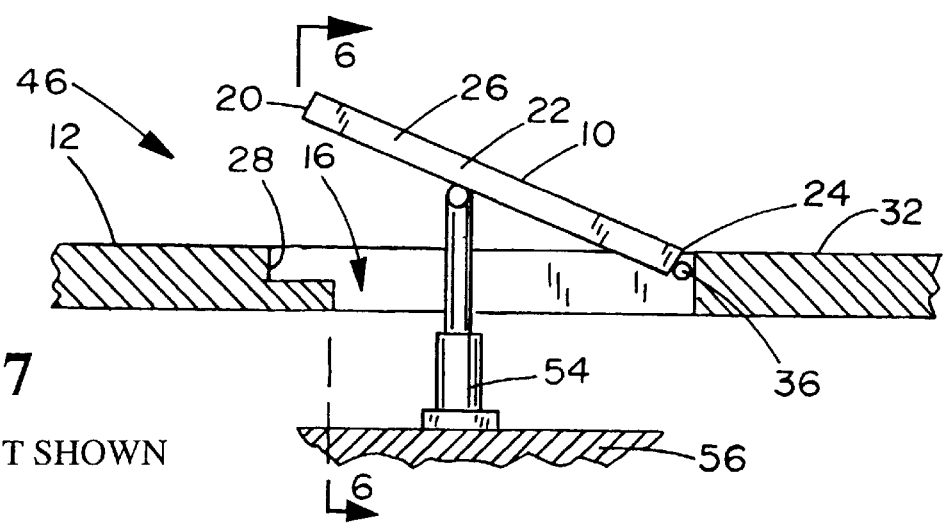
FIG. 7 is a front cross-sectional view of the door sealing system of FIG. 5 as seen along axis 7—7 (the elastic seal thereof is not shown for ease explanation)

Referring now to the drawings wherein the showings are for purposes of illustrating preferred embodiments of the present invention only, and not for purposes of limiting the same, FIGS. 1–8 illustrate an aircraft door sealing system constructed in accordance with the present invention.

According to the present invention, there is provided an aircraft door 10 which is rotatable between open and closed positions with respect to a door frame 12. As such, the door 10 is configured to rotate about an axis of rotation 14. FIGS. 1–4 depict the door 10 in the closed position and FIGS. 5–8 depict the door 10 in the open position. The door frame 12 defines a primary door opening 16. In general, the door frame 12 is sized and configured to have any geometry required to define a desired primary door opening 16, and thus may be rectangular (as depicted), circular, geometric, planar, arcuate or have any other geometry. As such, the present invention may be practiced with any number of door frame geometry configurations. In this respect, the door frame 12 depicted in FIG. 1–8 is symbolic of any geometry. The aircraft door 10 and door frame 12 are cooperatively sized and configured such that the door 10 is received by the door frame 12. It is contemplated that the door 10 may have any geometry and is generally sized and configured in reference to door frame 12. Nonetheless, in the preferred embodiment, the door 10 is of a isosceles trapezoid shape as discussed more fully below. It is contemplated that when the door 10 is in its closed position, a gap or surface discontinuity 18 is formed therebetween, as best depicted in FIG. 1.

As will be described in more detail below, the aircraft door 10 is specifically adapted to sealably engage a door frame 12 despite changes in the geometry thereof. Such changes of the door frame geometry may result in the formation of or increase the size of the gap 18 occurring between the aircraft door 10 and the door frame 12. As such a gap 18 tends to increase the radar signature associated therewith, the present invention functions to reduce or mitigate such radar signature.

Referring now to FIG. 1, the door 10 is generally defined and bounded by a peripheral door opening portion 20 and a peripheral door seal portion 22. The peripheral door seal portion 22 preferably has a door hingeline section 24 and a pair of opposing door side sections 26. The door hingeline section 24 is proximate to and lies parallel to the door axis of rotation 14. The door hingeline section 24 is disposed between the opposing door side sections 26. In this respect, the door side sections 26 abut the peripheral door opening portion 20. The door opening portion 20 is preferably disposed parallel to the door hingeline section 24.

The door frame 12 is generally defined by a peripheral frame opening portion 28 and a peripheral frame seal portion 30. When the door 10 is in the closed position, the frame opening portion 28 and the frame seal portion 30 are respectively sized and configured to be aligned adjacent the door opening portion 20 and the door seal portion 22. The peripheral frame seal portion 30 preferably has a frame hingeline section 32 and a pair of opposing frame side sections 34. The frame hingeline section is 32 disposed between the frame side sections 34. In this respect, the frame side sections 34 abut the peripheral frame opening portion 28. When the door 10 is in the closed position, the frame hingeline section 32 and the frame side sections 34 are respectively sized and configured to be aligned adjacent the door hingeline section 24 and the door side sections 26.

In the preferred embodiment, a hinge 36 is provided which is in mechanical communication with door 10 and door frame 12 for facilitating the rotational movement of the door 10 between the open and closed positions. The hinge 36 is interposed between and parallel to the door hingeline section 24 of the peripheral door seal portion 22 and the frame hingeline section 32 of the peripheral frame seal portion 30. Other apparatus and methods for facilitating the rotational movement of the aircraft door 10 between the open and closed positions are chosen from those which are well known to one of ordinary skill in the art.

Importantly, an elastic seal 38 interposed between the door 10 and the door frame 12. The seal 38 is attached to the door seal portion 22 and the frame seal portion 30. Preferably, the seal 38 is attached to the door side sections 26 and the frame side sections 34, and therefore spans the gap 18 therebetween. Advantageously, the seal 38 is expandable and contractible for permitting movement of the door 10 between the open and closed positions thereof. In particular, the elastic seal 38 is provided with seal side sections 40 which are respectively disposed between the door side sections 26 and the frame side sections 34. Further, the seal 38 is attached to the door hingeline section 24 and the frame hingeline section 32, and therefore spans the gap 18 therebetween. In particular, the seal 38 is further provided with a seal hingeline section 42 which flexes to facilitate movement of the door 10 between the open and closed positions thereof.

For ease of illustration, the edges of the elastic seal 38 are depicted as not being smoothly integrated with the attached door 10 and door frame 12, and thereby creating a non-coplanar surface contour discontinuity. It is contemplated that in practice, the edges of the elastic seal 38 would smoothly transition between the adjacent portions of the door 10 and door frame 12. In this respect, the elastic seal 38 is depicted as symbolic. As one of ordinary skill in the art could appreciate, the door 10 and door frame 12 could include indentures to more integrally receive the edges of the elastic seal 38. Additionally, the edges of the elastic seal 38 may be beveled to facilitate a more smooth surface transition.

The seal 38 is provided with a pair of seal opening edges 44 which are disposed between the door opening portion 20 and the peripheral frame opening portion 28. A secondary door opening 46 is collectively defined by the door opening portion 20 of the door 10, the frame opening portion 28 of the door frame 12, and the seal opening edges 44 of the elastic seal 38 when the door 10 is in the open position. The secondary door opening 46 facilitates access therethrough to the primary door opening 16 of the door frame 12. In this respect, when the door 10 is rotated from the closed position to the open position the seal opening edges 44 are elongated thereby forming the secondary door opening 46 thereat. As such, the size of the secondary door opening 46 is constrained by the elongation of the seal opening edges 44.

The elastic seal 38 is preferably formed of an elastomeric material, such as silicon or rubber. The seal 38 may be formed of a single sheet or of multiple sections and/or layers of material. It is contemplated that the seal 38 while having elastic characteristics must also be durable so as to withstand environmental operating conditions. For example, the seal 38 may be formed of a silicon sheet having a thickness of one quarter of an inch and able to undergo elastic elongations of 25 to 40 percent. Other suitable material choices for the elastic seal 38 may be chosen from those which are well known to one of ordinary skill in the art.

Advantageously, the elastic seal 38 may be formed of an electrically conductive material. In this respect, the seal 38 may be coated or impregnated with an electrically conductive material. It is contemplated that the door/door frame radar signature is impacted by the conductibility of electromagnetic energy across and between the surfaces of the door 10 and door frame 12. As such, by forming the seal 38 of an electrically conductive material, the seal 38 facilitates the conduction of electromagnetic energy across the seal 38 from the door frame 12 to the door 10 for mitigating the aircraft door radar signature thereat. Alternatively, the elastic seal 38 may be formed of a radar absorptive material (RAM). In this respect, the seal 38 may be coated with an outer radar absorptive material. As such, the seal 38 facilitates a mitigation of the radar signature thereat.

It is contemplated that the apparatus and methods for attaching the seal 38 to the door 10 and door frame 12 are chosen from those which are well known to one of ordinary skill in the art, and may include the use of a plurality of fasteners 48, for example. Preferably, the elastic seal 38 is removably attached to facilitate ease of maintenance and access thereat. In addition, the seal 38 is preferably attached between the door 10 and door frame 12 such that the seal is in tension and undergoes a slight degree of strain while the door is in the closed position. For example, the seal 38 may be configured to experience a two percent strain. It is contemplated that such pre-strain mitigates against undue buckling or out-of-plane deflection of the seal 38.

As mentioned above, in the preferred embodiment of the present invention, the door 10 defines an isosceles trapezoid shape. In this regard, the opposing door side sections 26 angularly disposed respect to the door hingeline section 24 so as to facilitate a substantially uniform percent elongation or strain of the seal side sections 40. In particular, the seal side sections 40 locally expand along axes of expansion 50 when the door is in the open position. As a result of the rotational movement of the door 10 about the door axis of rotation 14, the linear translation of those elemental portions of the door side sections 26 which are further away from the door axis of rotation 14 are progressively increased. The greatest translational movement occurs adjacent the door opening portion 20. As such, the attached seal side sections 26 locally experience increased linear expansion across the seal side sections 26. The present invention recognizes that by angularly forming the door side sections 26 so as to facilitate a substantially uniform percent elongation or strain of the seal side sections 40 has its advantages. In particular, uniformity of elongation of the seal side sections 40 tends to mitigate undue buckling of the seal side sections 40 when the door 10 is in the open position. Additionally, it is contemplated that a uniformity strain distributed across seal side sections 40 mitigates undue wear and tear of the seal sides sections 40 which may result from localized stain concentrations.

Figure 8:
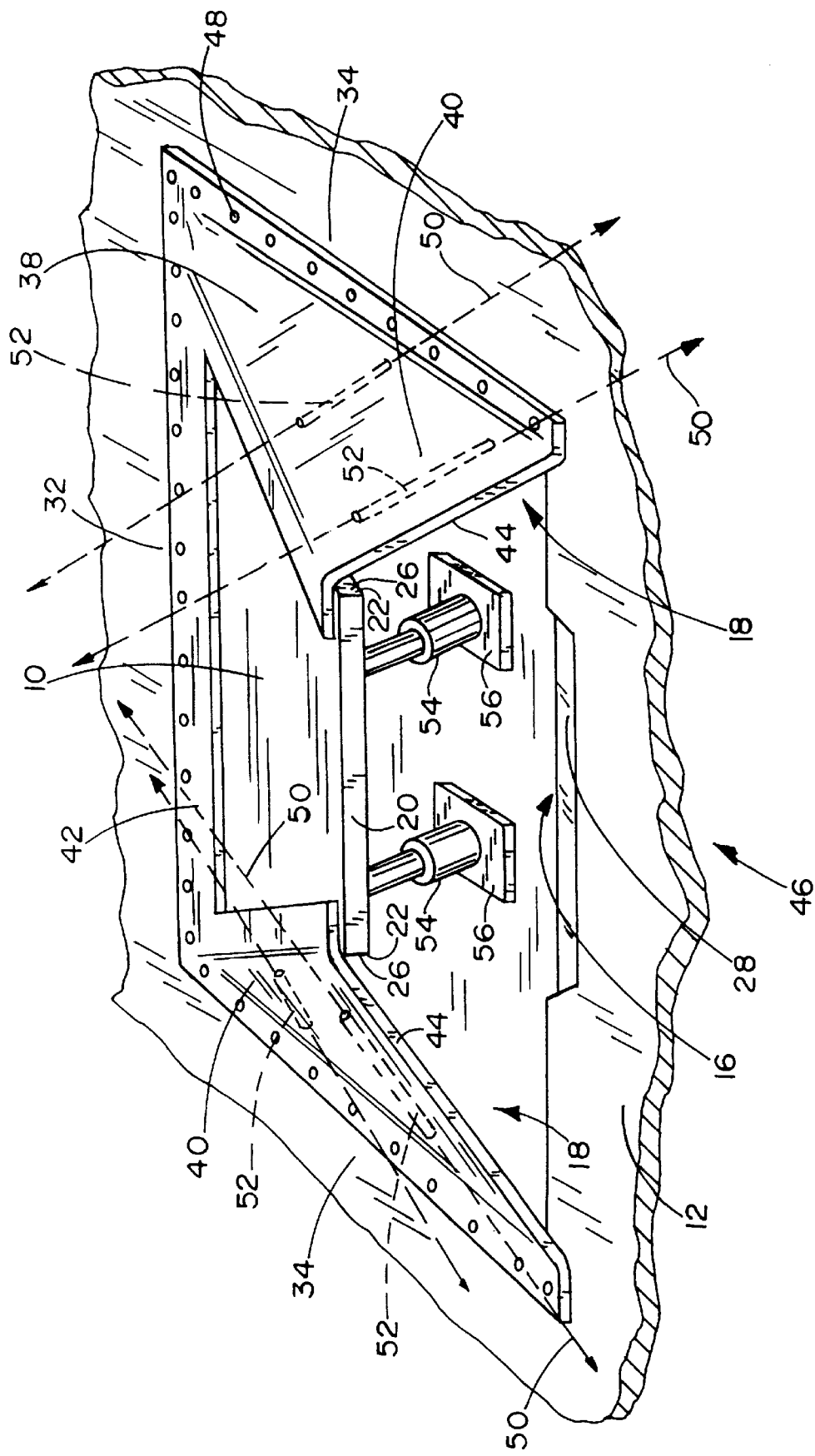
FIG. 8 is a perspective view of the door sealing system of FIGS. 5 and 6.

In the preferred embodiment of the door sealing system of the present invention, there is provided reinforcement rods 52 for supporting the elastic seal 48 (as depicted in FIG. 8). In particular, the reinforcement rods 52 mitigate against undesirable out-of-plane bubbling or deflection of the seal side sections 40. The reinforcement rods extend through the elastic seal 38 in the plane thereof and are disposed in slidable communication therewith. The reinforcement rods 52 are aligned along the axes of expansion 50, and therefore do not substantially resist against natural expansive movement of the seal side sections 40 when the door 10 is rotated into the open position. Additionally, the reinforcement rods 52 may be adjustable in length so as to expand and contract in response to localized expansion and contraction of the seal side sections 40.

In addition, the door sealing system of the present invention may be further provided with door actuator devices 54. The actuator devices 54 may be chosen from those which are well known to those of ordinary skill in the art. In this regard, the actuator devices 54 are symbolically depicted and are shown to mechanically communicate with the door 10 and aircraft internal supports 56 for rotating the door 10 relative to the door frame 12. It is contemplated that such actuator devices 54 must apply sufficient force to the door 10 so as to overcome any opposing forces resulting from the expansion of the seal 38.

It is further contemplated, that the door side sections 26 may be engaged with the aircraft internal supports 56 when the door 10 is in the closed position. Such any arrangement would facilitate addition support of the door 10 by allowing the mechanical transfer of load between the door side sections 26 and the internal supports 56. Moreover, the internal supports 56 may additionally be attached to the door frame 12 so as to facilitate the transfer of loads between the door frame 12 and the door side sections 26. Furthermore, the aircraft internal supports 56 may extend substantially within the gap 18 so as to support the seal side sections 40 and mitigate against undesirable out-of-plane deflections. It is recognized, however, such an arrangement would decrease the effective area of the primary door opening 16. Note that internal supports 56 are neither depicted as being engagable with the door side sections 26 nor substantially spanning the gap 18. In this respect, the internal supports 56 are depicted being merely symbolic and can be situated anywhere within the aircraft relative to the door 10 and of any size, shape and configuration.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An aircraft door sealing system for use with an aircraft door movable between open and closed positions with respect to a door frame, the door having a peripheral door opening portion and a peripheral door seal portion, the door frame having a peripheral frame opening portion and a peripheral frame seal portion, the frame opening portion being aligned adjacent the door opening portion when the door is in the closed position, the frame seal portion being aligned adjacent the door seal portion when the door is in the closed position, the sealing system comprising:

an elastic seal interposable between the door and the door frame, the seal being attachable to the door seal portion and the frame seal portion, the seal being expandable and contractible for permitting movement of the door between the open and closed positions thereof, the seal having a pair of seal opening edges disposable between the door opening portion and the peripheral frame opening portion; and wherein an opening is collectively defined by the door opening portion, the frame opening portion and the seal opening edges when the door is in the open position for facilitating access through the opening and the door frame.

2. The aircraft door sealing system of claim 1 wherein the elastic seal is formed of an elastomeric material.

3. The aircraft door sealing system of claim 2 wherein the elastic seal is formed of silicon.

4. The aircraft door sealing system of claim 1 wherein the elastic seal is formed of an electrically conductive material.

5. The aircraft door sealing system of claim 4 wherein the elastic seal is formed of a material which is impregnated with an electrically conductive material.

6. The aircraft door sealing system of claim 1 wherein the elastic seal is formed of a radar absorptive material.

7. The aircraft door sealing system of claim 1 further comprises reinforcement rods for supporting the elastic seal.

8. The aircraft door sealing system of claim 7 wherein the reinforcement rods are adjustable in length.

9. The aircraft door sealing system of claim 7 wherein the reinforcement rods extend through the elastic seal in slidable communication therewith.

10. The aircraft door sealing system of claim 7 wherein the elastic seal locally expands along axes of expansion and the reinforcement rods are aligned along the axes of expansion.

11. The aircraft door sealing system of claim 1 further comprises an actuator device attachable in mechanical communication with the aircraft door for moving the door between the open and closed positions.

12. The aircraft door sealing system of claim 1 further comprises a hinge interposable between the door and the door frame for rotating the door between the open and closed positions.

13. The aircraft door sealing system of claim 12 wherein the peripheral frame seal portion has a frame hingeline section, the peripheral door seal portion has a door hingeline section, the hinge is disposable adjacent the door and frame hingeline sections.

14. The aircraft door sealing system of claim 1 wherein the door has an isosceles trapezoidal shape, the peripheral door seal portion having a pair of opposing angular sections and a hingeline section disposed therebetween, the hingeline section being parallel to the peripheral door opening portion, the pair of opposing angular sections having angular orientations with respect to the hingeline section which correspond to a substantially uniform elongation of the elastic seal when disposed adjacent the angular sections when the door is in the open position.

15. A system for mitigating an aircraft door radar signature for use with an aircraft door movable between open and closed positions with respect to a door frame, the door having a peripheral door opening portion and a peripheral door seal portion, the door frame having a peripheral frame opening portion and a peripheral frame seal portion, the frame opening portion being aligned adjacent the door opening portion when the door is in the closed position, the frame seal portion being aligned adjacent the door seal portion when the door is in the closed position, the sealing system comprising:

an electrically conductive elastic seal interposable between the door and the door frame, the seal being attachable to the door seal portion and the frame seal portion, the seal being expandable and contractible for permitting movement of the door between the open and closed positions thereof, the seal having a pair of seal opening edges disposable between the door opening portion and the frame opening portion;

wherein an opening is collectively defined by the door opening portion, the frame opening portion and the seal opening edges when the door is in the open position for facilitating access through the opening and the door frame; and wherein electromagnetic energy is conductible across the seal from the door frame to the door when the seal is attached thereto for mitigating the aircraft door radar signature thereat.

16. An aircraft door movable between open and closed positions with respect to a door frame, the door frame having a peripheral frame opening portion and a peripheral frame seal portion, the door comprising:

a peripheral door opening portion aligned adjacent the frame opening portion when the door is in the closed position;

a peripheral door seal portion aligned adjacent the frame seal portion when the door is in the closed position;

an elastic seal interposed between and attached to the door seal portion and the frame seal portion, the seal being expandable and contractible for permitting movement of the door between the open and closed positions thereof, the seal having a pair of seal opening edges disposed between the door opening portion and the frame opening portion; and wherein an opening is collectively defined by the door opening portion, the frame opening portion and the seal opening edges when the door is in the open position for facilitating access through the opening and the door frame.

17. The aircraft door of claim 16 wherein the door has an isosceles trapezoidal shape.

18. The aircraft door of claim 17 wherein the peripheral door seal portion having an pair of opposing angular sections and a hingeline section disposed therebetween, the hingeline section being parallel to the peripheral door opening portion.

19. The aircraft door of claim 18 wherein the pair of posing angular sections having angular orientations with respect to the hingeline section which correspond to a substantially uniform elongation of the elastic seal adjacent the angular sections when the door is in the open position.

20. The aircraft door of claim 16 wherein the elastic seal is formed of an elastomeric material.

21. The aircraft door of claim 16 wherein the elastic seal is formed of silicon.

22. The aircraft door of claim 16 wherein the elastic seal is formed of an electrically conductive material.

23. The aircraft door of claim 22 wherein the elastic seal is formed of a material which is impregnated with an electrically conductive material.

24. The aircraft door of claim 16 wherein the elastic seal is formed of a radar absorptive material.

25. The aircraft door of claim 16 further comprises reinforcement rods for supporting the elastic seal.

26. The aircraft door of claim 25 wherein the reinforcement rods are adjustable in length.

27. The aircraft door of claim 25 wherein the reinforcement rods extend through the elastic seal in slidable communication therewith.

28. The aircraft door of claim 25 wherein the elastic seal locally expands along axes of expansion and the reinforcement rods are aligned along the axes of expansion.

29. The aircraft door of claim 16 further comprises an actuator device in mechanical communication with the aircraft door for moving the between the open and closed positions.

30. The aircraft door of claim 16 further comprises a hinge interposed between the door and the door frame for rotating the door between the open and closed positions.

31. The aircraft door of claim 30 wherein the peripheral frame seal portion has a frame hingeline section, the peripheral door seal portion has a door hingeline section, the hinge is disposed adjacent the door and frame hingeline sections.

* * * * *